US004001559B2

United States Statutory Invention Registration [19]

[11] Reg. Number: H1559

Prieto et al.

[45] Published: Jul. 2, 1996

[54] SECONDARY ALKYL SULFATE-CONTAINING LIGHT DUTY LIQUID DETERGENT COMPOSITIONS

[75] Inventors: Nelson E. Prieto, Richmond; JanElsa E. Carty, Sugarland; Ruth J. Blanco; William W. Schmidt, both of Houston, all of Tex.

[73] Assignee: Shell Oil Company, Houston, Tex.

[21] Appl. No.: 111,794

[22] Filed: Aug. 25, 1993

[51] Int. Cl.[6] ..... C11D 1/14

[52] U.S. Cl. ..... 510/235; 510/237; 510/495; 510/424; 510/427; 510/426; 510/428; 510/429

[58] Field of Search ..... 252/547, 531, 252/550, 546, DIG. 13

[56] References Cited

U.S. PATENT DOCUMENTS

| | | | |
|---|---|---|---|
| 4,052,342 | 10/1977 | Fernley et al. | 252/541 |
| 4,079,020 | 3/1978 | Mills et al. | 252/547 |
| 4,235,752 | 11/1980 | Rossall et al. | 252/551 |
| 4,316,824 | 2/1982 | Pancheri | 252/551 |
| 4,507,219 | 3/1985 | Hughes | 252/118 |
| 4,556,509 | 12/1985 | Demangeon et al. | 252/542 |
| 4,561,998 | 12/1985 | Wertz et al. | 252/547 |
| 4,595,526 | 6/1986 | Lai | 252/545 |
| 4,596,672 | 6/1986 | MacDuff et al. | 252/544 |
| 4,614,612 | 9/1986 | Reilly et al. | 252/541 |
| 4,663,069 | 5/1987 | Llenado | 252/117 |
| 4,732,707 | 3/1988 | Naik et al. | 252/548 |
| 4,880,569 | 11/1989 | Leng et al. | 252/550 |
| 4,923,635 | 5/1990 | Simion et al. | 252/545 |
| 4,923,636 | 5/1990 | Blackburn et al. | 252/550 |
| 5,035,838 | 7/1991 | Merrill et al. | 252/545 |
| 5,075,041 | 3/1992 | Lutz | 252/548 |
| 5,096,622 | 3/1992 | Simion et al. | 252/548 |
| 5,219,495 | 6/1993 | Hsu | 252/559 |

FOREIGN PATENT DOCUMENTS

| | | | |
|---|---|---|---|
| 0399752A2 | 11/1990 | European Pat. Off. | C11D 1/06 |
| 2168377 | 6/1986 | United Kingdom | C11D 3/14 |

*Primary Examiner*—Charles T. Jordan
*Assistant Examiner*—J. R. Hardee
*Attorney, Agent, or Firm*—Pamela J. McCollough

[57] ABSTRACT

The present invention relates to light duty liquid detergent compositions containing one or more secondary alkyl sulfate surfactant components.

15 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SECONDARY ALKYL SULFATE-CONTAINING LIGHT DUTY LIQUID DETERGENT COMPOSITIONS

FIELD OF THE INVENTION

The present invention relates to light duty liquid detergent compositions containing one or more secondary alkyl sulfate surfactant components.

BACKGROUND OF THE INVENTION

Linear alkylbenzene sulfonate (LAS) is one of the most widely used surfactants in commerce. It finds special application in light duty liquid detergents. A potential disadvantage of LAS, however, is that under hard water conditions, i.e., calcium levels greater than about 150 parts per million, it can interact with cationic water hardness ions, such as calcium, thereby becoming inactivated through precipitation. While this is a problem common to anionic surfactants, LAS is especially sensitive to water hardness ions.

It has been found that light duty liquid detergent formulations containing one or more secondary alkyl sulfate compounds can be used in place of LAS as well as primary alkyl sulfates with the advantages being increased tolerance for water hardness ions, good detergency properties, acceptable biodegradability, rapid dissolution rates and good foam performance.

SUMMARY OF THE INVENTION

The present invention provides a light duty liquid detergent composition which comprises from about 1 percent by weight to about 35 percent by weight of one or more secondary alkyl sulfate compounds, from about 0.1 percent by weight to about 20 percent by weight of suds stabilizer and from about 50 percent by weight to about 97 percent by weight of water, basis the total weight of the composition.

DESCRIPTION OF THE PREFERRED EMBODIMENTS

Figure 1:
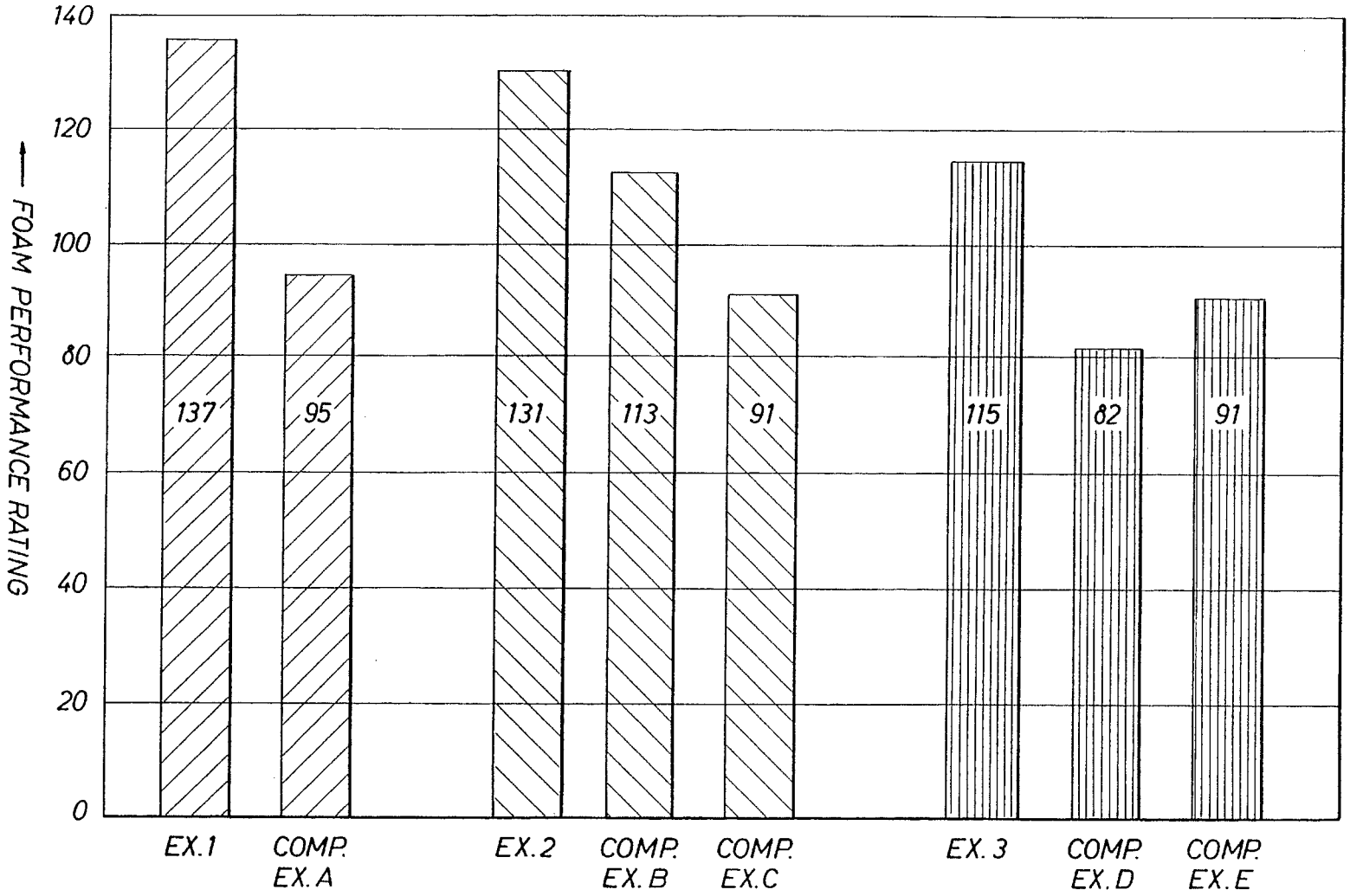
FIG. 1 represents the relative foam performance of secondary alkyl sulfates in light duty dishwashing liquid detergent formulations.

The secondary alkyl sulfate anionic surfactant component in the light duty liquid formulation provides highly effective detergent foam performance while retaining the grease-cutting characteristics of LAS. The formulation is very effective for the emulsification of oily food soils. The secondary alkyl sulfate component also results in a formulation which is lighter in color than typical light duty liquid formulations containing LAS and/or alcohol ethoxysulfate. This reduction in color is accomplished without adversely affecting the foam performance of the formulation.

The secondary alkyl sulfate component serves as a multi functional component in the formulation. Functioning as anionic surfactant, the presence of these compounds aids in the removal of greasy food soils. The secondary alkyl sulfate component further aids in providing a detergent formulation which is tolerant to hard water wash applications. In addition, the secondary alkyl sulfate component aids in facilitating the emulsification and suspension of oily food soils. These several functions of the secondary alkyl sulfate compounds provide a very effective formulation in terms of both its detergent performance and physical properties.

Secondary alkyl sulfates suitable for use in the formulation of the invention have a formula

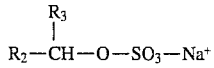

wherein $R_2$ represents alkyl groups having from about 3 to about 18 carbon atoms, and $R_3$ represents alkyl groups having from about 1 to about 6 carbon atoms. In a preferred embodiment, $R_2$ is an alkyl group having from about 10 to about 16 carbon atoms, and $R_3$ is an alkyl group having from about 1 to about 2 carbon atoms. In a particularly preferred embodiment, $R_2$ and $R_3$ together are alkyl groups having a total of from about 11 to about 17 carbon atoms. Preferred secondary alkyl sulfate compounds include $C_{12}$ secondary alkyl sulfates, $C_{14}$ secondary alkyl sulfates, $C_{16}$ secondary alkyl sulfates, $C_{18}$ secondary alkyl sulfates, and blends of these compounds. The secondary alkyl sulfate component of the light duty liquid compositions of the present invention typically comprises a blend of $C_{14}$ secondary alkyl sulfate compounds and $C_{16}$ secondary alkyl sulfate compounds. In a preferred embodiment, the secondary alkyl sulfate component is a blend which contains from about 0.6 percent by weight to about 10 percent by weight, basis the total weight of the composition, of $C_{14}$ secondary alkyl sulfate and from about 4 percent by weight to about 30 percent by weight, basis the total weight of the composition of $C_{16}$ secondary alkyl sulfate. In a particularly preferred embodiment, the secondary alkyl sulfate component of the composition contains from about 1 percent by weight to about 7 percent by weight of $C_{14}$ secondary alkyl sulfate and from about 4 percent by weight to about 25 percent by weight of $C_{16}$ secondary alkyl sulfate.

The secondary alkyl sulfates suitable for use as the secondary alkyl sulfate component in the invention are solid, free flowing powdered materials which are anhydrous and which are substantially free of diluents. These solid surface active compositions are generally prepared by a crystallization technique. Specifically, the solid secondary alkyl sulfate compositions are prepared by contacting a detergent range alkyl sulfuric acid-containing solution with a base in aqueous solution, removing substantially all of the water from the mixture, cooling in the presence of a nonionic organic liquid diluent to crystallize a solid secondary alkyl sulfate-containing surface active composition from the mixture, and recovering and drying the crystallized secondary alkyl sulfate product. The solid secondary alkyl sulfate product obtained contains at least about 80 percent by weight to about 99 percent by weight, preferably about 88 percent by weight to about 99 percent by weight of secondary alkyl sulfate, basis the total weight of the product. The product generally contains some residual level of sodium sulfate. The product typically contains less than about 12 percent by weight, preferably less than about 9 percent by weight, sodium sulfate.

The light duty liquid composition of the invention comprises in the range of from about 1 percent by weight to about 35 percent by weight of the secondary alkyl sulfate, basis the total weight of the composition. Formulations containing in the range of from about 2 percent by weight to about 20 percent by weight secondary alkyl sulfate are preferred, while formulations containing from about 2 by weight to about 17 percent by weight of secondary alkyl sulfate component are generally more preferred.

In addition to the secondary alkyl sulfate anionic component, the light duty liquid detergent composition may also contain additional anionic surfactant components, if desired.

Suitable additional anionic components include alkenyl carboxysulfonates, methylester sulfonates, alcohol ethoxysulfates, linear alkyl benzene sulfonates, alpha olefin sulfonates, and the like. While any of these anionic surfactants can be utilized in the composition, it is preferred that if an anionic surfactant is used in addition to the secondary alkyl sulfate anionic component in the light duty liquid composition, the additional anionic component is an alcohol ethoxysulfate characterized by the chemical formula:

$$R'—O—(CH_2CH_2O)_x—SO_3M$$

wherein R' is a straight chain or branched alkyl group having in the range of from about 8 to about 18 carbon atoms, preferably from about 12 to about 18 carbon atoms, or an alkylaryl group having an alkyl moiety having from about 8 to about 12 carbon atoms, x represents the average number of oxyethylene groups per molecule and is in the range of from about 1 to about 12, preferably from about 2 to about 12, and M is a cation selected from an alkali metal, an ammonium ion, and mixtures thereof. R' is preferably substantially straight chain alkyl, that is, at least about 50 percent, preferably about 85 percent, of the alkyl R' groups in the alcohol ethoxysulfate are straight chain. It is understood that R' can be substituted with any substituent which is inert such as, for, example, halo groups.

Examples of suitable alcohol ethoxysulfates which can be used in the composition of the present invention include the sulfated ethoxylated fatty alcohols, preferably linear primary and secondary alcohols with about $C_8$ to about $C_{18}$ alkyl groups, preferably about $C_{12}$ to about $C_{15}$ alkyl groups, and an average of about 1 to about 12, preferably about 5 to about 12 moles of ethylene oxide per mole of alcohol, and sulfated ethoxylated alkylphenols with about $C_8$ to about $C_{12}$ alkyl groups, preferably about $C_8$ to about $C_{10}$ alkyl groups, and an average of about 1 to about 12 moles of ethylene oxide per mole of alkylphenol. The preferred class of alcohol ethoxysulfates are the sulfated linear alcohols, such as the sulfated $C_{12}$ to about $C_{15}$ alcohols which have been ethoxylated with an average of about 2 to about 12 moles of ethylene oxide. A most preferred alcohol ethoxysulfate for highly effective detergent performance is prepared by sulfating a $C_{12}$–$C_{15}$ alcohol ethoxylate with an average of 3.0 moles of ethylene oxide. A most preferred alcohol ethoxysulfate for a particularly mild light duty liquid composition is prepared by sulfating a $C_{12}$–$C_{13}$ alcohol ethoxylate with an average of 6.5 moles of ethylene oxide.

When the light duty liquid composition of the invention contains an alcohol ethoxysulfate as an additional anionic component, the alcohol ethoxysulfate component generally comprises in the range of from about 1 percent by weight to about 30 percent by weight of the alcohol ethoxysulfate, basis the total weight of the composition. Formulations containing in the range of from about 2 percent by weight to about 20 percent by weight alcohol ethoxysulfate are preferred, while formulations containing from about 2 percent by weight to about 17 percent by weight of alcohol ethoxysulfate component are generally more preferred. In a preferred embodiment, the light duty liquid formulation will contain from about 3 percent by weight to about 17 percent by weight of an alcohol ethoxysulfate component.

When the light duty liquid composition of the present invention contains an additional anionic surfactant component, the ratio of the secondary alkyl sulfate anionic component to the additional anionic surfactant component is typically in the range of from about 0.5:1 to about 2:1, and preferably in the range of from about 0.8:1 to about 1.25:1.

The light duty liquid detergent compositions of the present invention also from about 0.1 percent by weight up to about 20 percent by weight, preferably about 8 percent by weight to about 12 percent by weight, basis the total weight of the composition, of a suds stabilizing "nonionic" surfactant or mixtures thereof. As used herein, the terms "suds stabilizers" and "foam boosters" are used interchangeably.

Suds stabilizing nonionic surfactants which are suitable for use in the instant invention are of four basic types - the ethylene oxide condensates, the sugar-derived glycols (i.e., alkylpolyglycosides) the fatty acid amides, and the amine oxide semi-polar nonionics.

The ethylene oxide condensates are broadly defined as compounds produced by the condensation of ethylene oxide groups (hydrophilic in nature) with an organic hydrophobic compound, which can be aliphatic or alkyl aromatic in nature. The length of the hydrophilic or polyoxyalkylene radical which is condensed with any particular hydrophobic group can be readily adjusted to yield a water-soluble compound having the desired balance between hydrophilic and hydrophobic elements. Examples of ethylene oxide condensates suitable for use as suds stabilizers include the condensation products of aliphatic alcohols with ethylene oxide and the ethylene oxide condensates of alkyl phenols and alkylpolyglycosides.

With respect to the condensation products of aliphatic alcohols with ethylene oxide, the alkyl chain of the aliphatic alcohol can either be straight or branched. The alkyl chain typically contains from about 10 to about 18 carbon atoms, and preferably from about 10 to about 14 carbon atoms; and the ethylene oxide is present in amounts of from about 5 to about 30 moles of ethylene oxide per mole of alcohol, and preferably from about 5 to about 14 moles of ethylene oxide per mole of alcohol. Examples of such ethoxylated alcohols include the condensation product of about 6 moles of ethylene oxide with 1 mole of tridecanol, the condensation product of myristyl alcohol with about 10 moles of ethylene oxide per mole of myristyl alcohol, the condensation product of ethylene oxide with coconut fatty alcohol with the coconut alcohol being a mixture of fatty alcohols with alkyl chains varying from 10 to 14 carbon atoms and the condensate containing about 6 moles of ethylene oxide per mole of alcohol, and the condensation product of about 9 moles of ethylene oxide with the above-described coconut fatty alcohol.

With respect to the ethylene oxide condensates of alkyl phenols, these compounds include the condensation products of alkyl phenols having an alkyl group containing from about 6 to about 15 carbon atoms, preferably from about 6 to about 10 carbon atoms, in either a straight chain or branched chain configuration, with ethylene oxide. The ethylene oxide will typically be present in amounts of from about 5 to about 30 moles, preferably from about 5 to about 14 moles of ethylene oxide per mole of alkyl phenol. The alkyl substituent in such compounds can be derived from polymer propylene, diisobutylene, octene, nonene and the like. Examples of such compounds include nonyl phenol condensed with about 9.5 moles of ethylene oxide per mole of alkyl phenol, and octyl phenol condensed with about 12 moles of ethylene oxide per mole of octyl phenol.

With respect to the sugar-derived glycols or alkyl glycosides, these compounds are low irritant, nonionic surface active agents. Even though they are nonionic in nature, alkyl glycosides not only produce stable foams by themselves, but also are known to act as foam stabilizers for anionic surface active agents. Particularly suitable sugar-derived glycols are the alkylpolyglycosides.

Suitable examples of the amide type of suds stabilizing nonionic surface active agents include the glucosamides and the ammonia, monoethanol and diethanol amides of fatty acids having an acyl moiety of from about 8 to about 18 carbon atoms and represented by the general formula $$R_1CO—N(H)_{m-1}(ROH)_{3-m}$$

wherein $R_1$ is a saturated or unsaturated aliphatic hydrocarbon radical having from about 7 to about 21 carbon atoms, and preferably from about 11 to about 17 carbon atoms; R represents a methylene or ethylene group; and m is 1, 2 or 3, and preferably 1. Specific examples of these amides are monoethanol coconut fatty acid amide and diethanol dodecyl fatty acid amide. These acyl moieties may be derived from naturally occurring glycerides, e.g., coconut oil, palm oil, soybean oil and tallow, but can be derived synthetically, e.g., by the oxidation of petroleum, or by hydrogenation of carbon monoxide by the Fischer-Tropsch process. The monoethanol amides and diethanol amides of $C_{12}$ to $C_{14}$ fatty acids are preferred.

The amine oxide semi-polar suds stabilizing nonionic surface active agents comprise compounds and mixtures of compounds having a formula:

$$R_9(C_2H_4O)_nN(R_{10})(R_{11})\rightarrow O$$

wherein $R_9$ is an alkyl, 2-hydroxyalkyl, 3-hydroxyalkyl, or 3-alkoxy-2-hydroxypropyl radical in which the alkyl and alkoxy, respectively, contain from about 8 to about 18 carbon atoms, $R_{10}$ and $R_{11}$ are each methyl, ethyl propyl, isopropyl, 2-hydroxyethyl, 2-hydroxypropyl, or 3-hydroxypropyl and n is 0 to about 10. Particularly preferred amine oxides have the formula:

$$R_9—N(R_{10})(R_{11})\rightarrow O$$

wherein $R_9$ is a $C_{10-14}$ alkyl and $R_{10}$ and $R_{11}$ are methyl or ethyl. The amine oxides are the most preferred suds stabilizing nonionic surface active agents.

The preferred sudsing characteristics of the compositions of the present invention are those which will provide the user of the product with an indication of cleaning potential in a dishwashing solution. Soils encountered in dishwashing act as suds depressants and the presence or absence of suds from the surface of the dishwashing solution is a convenient guide to product usage. Suds stabilizers may also act as thickening agents n the dishwashing composition. If desired, mixtures of suds stabilizers can also be used in the composition of the present invention.

In a preferred embodiment, the light duty liquid composition contains a water-soluble zwitterionic surfactant. A suitable zwitterionic surfactant is a water-soluble betaine having the general formula:

$$R_4—N(R_5)(R_6)—R_7—COO^-$$

wherein $R_4$ is an alkyl group having 10 to about 20 carbon atoms, preferably 12 to about 16 carbon atoms, or the amido radical:

$$R_8—C(=O)—N(H)—(CH_2)_a^-$$

wherein $R_8$ is an alkyl group having about 9 to about 19 carbon atoms and a is the integer 1 to 4; $R_5$ and $R_6$ are each alkyl groups having 1 to 3 carbons and preferably 1 carbon; $R_7$ is an alkylene or hydroxyalkylene group having from 1 to 4 carbon atoms and, optionally, one hydroxyl group. Typical alkyldimethyl betaines include decyl dimethyl betaine or 2-(N-decyl-N, N-dimethylammonio) acetate, coco dimethyl betaine or 2-(N-coco-N, N-dimethylammonio) acetate, myristyl dimethyl betaine, palmityl dimethyl betaine, lauryl dimethyl betaine, cetyl dimethyl betaine, stearyl dimethyl betaine, and the like. The amidobetaines similarly include cocoamidoethyl betaine, cocoamidopropyl betaine and the like. A preferred betaine is coco ($C_8$–$C_{18}$) amidopropyl dimethyl betaine. When the light duty liquid composition of the present invention contains a zwitterionic surfactant, it typically contains from about 0.1 percent by weight to about 8 percent by weight, preferably from about 0.1 percent by weight to about 4 percent by weight, and most preferably, from about 0.1 percent by weight to about 1.0 percent by weight. The use of a zwitterionic surfactant in the composition provides advantages in formulatability, clarity and mildness.

The balance of the liquid composition will be an aqueous medium comprising water and about 0 percent by weight to about 8 percent by weight, preferably from about 2 percent by weight to about 5 percent by weight, basis the total weight of the light duty liquid composition, of a solubilizer. Suitable solubilizers include $C_2$–$C_3$ monohydric and polyhydric alcohols, water-soluble $C_1$–$C_3$ alkyl substituted benzene sulfonates, urea and the like, and mixtures thereof. Suitable monohydric alcohols include ethanol and isopropanol, with ethanol being preferred; and suitable polyhydric alcohols include propylene glycol and glycerol. Suitable $C_1$–$C_3$ alkylbenzene sulfonates are the sodium, potassium and ammonium salts, e.g., sodium xylenesulfonate, potassium toluene sulfonate and sodium isopropylbenzene sulfonate or sodium cumene sulfonate. Typically, the solubilizer is selected to provide clarity, to provide a low-temperature cloud point, and/or to control viscosity. Since the alcohol and sulfonate solubilizers do not exhibit the same effects, the liquid compositions may contain a mixture of alcohol and hydrotropic sulfonate solubilizers in order to obtain the benefits of both. Excessive use of solubilizers, i.e. greater than about 10 percent by weight, in dishwashing liquids may act as suds depressants.

The proportion of water in the light duty liquid composition will generally be in the range of from about 50 percent by weight to about 97 percent by weight, preferably from about 55 percent by weight to about 95 percent by weight, basis the total weight of the light duty liquid composition.

The described light duty liquid compositions are essentially unbuilt liquids, i.e., they do not contain proportions of organic or inorganic builder salt in the detergent building proportions, and, therefore, are particularly suitable for use as liquid, hand dishwashing detergents. Thus, the compositions of the present invention can contain any of the usual adjuvants found in those compositions provided that they do not interfere with the performance properties of the present light duty liquids. Such additional components include minor amounts of perfumes and colors for aesthetic purposes, opacifiers such as ethylene glycol distearate or polystyrene, thickening agents such as natural gums, hydroxypropyl methyl cellulose, or polyacrylates, sequestering agents such as citrate or ethylene diamine tetraacetate, preservatives such as formaldehyde or monomethyloldimethyl hydantoin, and inert salts such as sodium sulfate. The total concentration of added ingredients typically will be less than about 5 percent by weight, preferably less than about 3 percent by weight of the total composition.

In general, the viscosity of the light duty liquid compositions will be variable over the range of from about 20 centipoise (cps) to about 2000 cps, and preferably from about 75 cps to about 1500 cps. Viscosity is measured using a Brookfield digital viscometer Model LVTD. The most preferred viscosity range is about 150 cps to about 1200 cps based upon consumer trends. It will be recognized by one skilled in the art, however, that liquids of even higher viscosity can be achieved by including up to about 5 percent by weight of a known thickening agent in the compositions.

The light duty liquid compositions of the present invention are typically prepared by admixing the individual detergent ingredients with the formula weight of water with agitation at a temperature in the range of from about 20° C. to about 70° C. Usually, the individual ingredients are added slowly and allowed to completely dissolve before any other ingredients are added. The secondary alkyl sulfate component is slowly added to warm water containing the alcohol ethoxysulfate, if present, and the solubilizers. The suds stabilizer is added last. Typically, the secondary alkyl sulfate is added in the powdered form to the solution at a temperature below about 70° C. The alcohol ethoxysulfate component, if present, is added to an aqueous solution of solubilizers in the form of a liquid, 60% active matter, prior to the addition of the secondary alkyl sulfate compound. Additionally, it is desirable to add suds stabilizing agents and any solubilizing agents to the formula weight of water prior to the addition of the secondary alkyl sulfate in order to avoid gellation. Any additional ingredients , such as color and perfume usually are added with agitation after the addition of the suds stabilizer while cooling the mixture to a temperature of about 24° C. The pH is generally adjusted, if necessary, to a pH in the range of from about 6.5 to about 9.0, preferably from about 7.0 to about 7.5, for dishwashing products by addition, for example, an organic or an inorganic acid such as sulfuric acid or citric acid or a base such as sodium hydroxide, potassium hydroxide or triethanolamine. Also, any adjustment of viscosity may be achieved by the addition of additional amounts of the appropriate solubilizers or thickening agents.

The ranges and limitations provided in the instant specification and claims are those which are believed to particularly point out and distinctly claim the present invention. It is, however, understood that other ranges and limitations which perform substantially the same function in substantially the same manner to obtain the same or substantially the same result are intended to be within the scope of the present invention as defined by the specification and claims.

The invention is further described with reference to the following examples, which are intended to illustrate certain aspects of the invention, without limiting its broader scope.

ILLUSTRATIVE EMBODIMENTS

Example 1

1.54 grams of $C_{12}$–$C_{15}$ alcohol ethoxysulfate having an average of 3 moles ethylene oxide (58.3% active matter, ammonium salt); 1.91 grams $C_{16}$ secondary alcohol sulfate (94% active matter) and 0.30 grams Ninol LMP (lauryl myristyl monoethanolamide (LMMEA), 98.69% AM) were sequentially added to 46.25 grams warm (50° C.) deionized water with gently stirring. The secondary alcohol sulfate was added to the aqueous mixture containing the alcohol ethoxysulfate since this component facilitated the solubilization of the secondary alcohol sulfate component. Each ingredient was added in a stepwise manner and allowed to completely dissolve before any other ingredients were added. The results are presented in Table I and FIG. 1.

Comparative Example A

Comparative Example A was carried out in a manner similar to Example 1 except that 6.0 grams of $C_{11}$ LAS (30% active matter, sodium salt) was used in the place of the secondary alkyl sulfate component. The results are presented in Table I and FIG. 1.

Example 2

0.99 grams amine oxide (suds stabilizer, dodecyl dimethyl amine oxide, 30.3% active matter) was added to 46.14 grams warm deionized water. 2.87 grams $C_{14}$ secondary alcohol sulfate (94.2% active matter) was added to the mixture. The results are presented in Table I and FIG. 1.

Comparative Example B

Comparative Example B was carried out in a manner similar to Example 2 except that 4.63 grams of $C_{12}$–$C_{15}$ alcohol ethoxysulfate having an average of 3 moles ethylene oxide (58.3% active matter, ammonium salt) was used in the place of the secondary alkyl sulfate component. 0.30 gram LMMEA (suds stabilizer, lauryl myristyl monoethanolamide, 98.69% active matter) was added to 45.07 grams water. The results are presented in Table I and FIG. 1.

Comparative Example C

Comparative Example C was carried out in the same manner similar to Example B, except that 9.0 grams of $C_{11}$ LAS (30% active matter, sodium salt) was used in the place of the secondary alkyl sulfate component. The results are presented in Table I and FIG. 1.

Example 3

Example 3 was carried out in the same manner similar to Example 1, except that 4.53 grams $C_{12}$–$C_{15}$ alcohol ethoxysulfate having an average of 3 moles ethylene oxide (58.3% active matter), 0.72 grams ethanol (solubilizer) and 2.0 grams sodium cumene sulfonate (solubilizer, 46.1% active matter, sodium salt) was added to 8.79 grams deionized water. 3.3 grams $C_{16}$ secondary alkylsulfate (100% active matter, sodium salt) was added with stirring followed by 0.66 grams LDEA (suds stabilizer, lauryl myristyl diethanolamide, 100% active matter). The results are presented in Table I and FIG. 1.

Comparative Example D

Comparative Example D was carried out in a manner similar to Example 3 except that 3.61 grams of $C_{11}$ LAS (30% active matter, sodium salt) was used in the place of the secondary alkyl sulfate component. The results are presented in Table I and FIG. 1.

Comparative Example E

Comparative Example E was carried out in a manner similar to Example 3, except that 10.20 grams $C_{12}$–$C_{15}$ alcohol ethoxysulfate having an average of 3 moles ethylene oxide (58.3% active matter, sodium salt) was used in place of the secondary alkyl sulfate component. The results are presented in Table I and FIG. 1.

TABLE I

SECONDARY ALKYLSULFATES (SAS) IN LIGHT DUTY LIQUIDS (LDLs)

| | Percent by Weight of Surfactants | | | | Hydrotrope[a)] | Ethanol | Water | |
|---|---|---|---|---|---|---|---|---|
| | LAS | SAS | AES | AMIDE | (% wt.) | (% wt.) | (% wt.) | FPR[b)] |
| Ex. 1 | None | 3.6 | 1.8 | 0.6 | None | None | 92.5 | 137 |
| Comp. Ex. A | 3.6 | None | 1.8 | 0.6 | None | None | 92.5 | 95 |
| Ex. 2 | None | 5.4 ($C_{14}$) | None | 0.6(AO)[c)] | None | None | 94.0 | 131 |
| Comp. Ex. B | None | None | 5.4 | 0.6(AO)[c)] | None | None | 94.0 | 113 |
| Comp. Ex. C | 5.4 | None | None | 0.6(AO)[c)] | None | None | 94.0 | 91 |
| Ex. 3 | None | 16.5 | 13.2 | 3.3 | 4.6 | 3.6 | 58.8 | 115 |
| Comp. Ex. D | 5.4 | None | 13.2 | 3.3 | 4.6 | 3.6 | 69.9 | 82 |
| Comp. Ex. E | None | None | 29.7 | 3.3 | 4.6 | 3.6 | 58.8 | 91 |

[a)]Hydrotrope (solubilizer used was sodium cumene sulfonate).
[b)]Foam performance rating (FPR) calculated using the soil titration test method described in "Performance Testing of Dishwashing Liquids: Development of a Foam Titration", Comun. Jorn. Com. Esp. Deterg., vol. 20, pp. 433–444 (1989). All examples and comparative examples were diluted and tested at a final surfactant concentration of 0.012 percent by weight of total surfactants, 150 ppm water hardness, and 40° C. Commercial household LDLs which are formulated with LAS typically have FPRs in the range of 82–114 using this test method. Non-LAS LDLs could have FPRs up to 125.
[c)]Amixe oxide (suds stabilizer).

DISCUSSION OF THE RESULTS AND DETAILED DESCRIPTION OF THE DRAWING

As can be seen in Table I and FIG. 1, direct replacement of secondary alkyl sulfate (Example 1) with linear alkylbenzene sulfonate (Comparative Example A) decreases the foam performance rating (FPR) from 137 to 95, a significant decrease in suds production. In a second set of experiments performed in approximately the same manner, the secondary alkyl sulfate-containing composition has a higher foam performance rating than either the linear alkylbenzene-sulfonate-containing composition or the alcohol ethoxysulfate-containing composition.

What is claimed is:

1. A liquid detergent composition comprising from about 1 percent by weight to about 35 percent by weight, basis the total weight of the composition, of one or more secondary alkyl sulfate compounds, from about 0.1 percent by weight to about 20 percent by weight, basis the total weight of the composition, of one or more suds stabilizers and from about 50 percent by weight to about 97 percent by weight, basis the total weight of the composition, of water.

2. The composition of claim 1 wherein the secondary alkyl sulfate compound has a formula

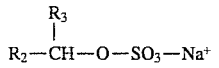

wherein $R_2$ represents an alkyl group having from about 3 to about 18 carbon atoms, and $R_3$ represents an alkyl group having from about 1 to about 6 carbon atoms.

3. The composition of claim 1 wherein the secondary alkyl sulfate compound is added to the composition in the form of a free flowing powder composition comprising from about 80 percent by weight to about 99 percent by weight, basis the total weight of the composition, of secondary alkyl sulfate.

4. The composition of claim 1 wherein the suds stabilizer is a nonionic surfactant selected from the group consisting of a $C_{10}$–$C_{14}$ alkyl amine oxides, $C_8$–$C_{18}$ amides, ethylene oxide condensates of $C_{10}$–$C_{14}$ alcohols or $C_6$–$C_{10}$ mono alkyl phenols having from about 5 to about 15 moles of ethylene oxide per mole of alcohol or alkyl phenol, $C_6$–$C_{18}$ alkylpolyglycosides, and mixtures thereof.

5. The composition of claim 4 wherein said suds stabilizer is an ethoxylated $C_{12}$–$C_{15}$ alcohol having an average of about 3 moles of ethylene oxide per mole of alcohol.

6. The composition of claim 4 wherein said suds stabilizer is an amine oxide nonionic surface active agent having the formula:

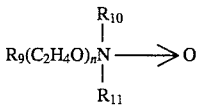

wherein $R_9$ is an alkyl, 2-hydroxyalkyl, 3-hydroxyalkyl, or 3-alkoxy-2-hydroxypropyl radical in which the alkyl and alkoxy, respectively, contain from about 8 to about 18 carbon atoms, $R_{10}$ and $R_{11}$ are each methyl, ethyl propyl, isopropyl, 2-hydroxyethyl, 2-hydroxypropyl, or 3-hydroxypropyl and n is 0 to about 10.

7. The composition of claim 1 wherein said composition comprises an additional anionic surfactant component.

8. The composition of claim 7 wherein said additional anionic component is selected from the group consisting of alkenyl carboxysulfonates, methylester sulfonates, alcohol ethoxysulfates, linear alkylbenzene sulfonates, alpha olefin sulfonates and mixtures thereof.

9. The composition of claim 7 wherein said additional anionic component is alcohol ethoxysulfate.

10. The composition of claim 9 wherein said alcohol ethoxysulfate is present in the liquid detergent composition in an amount in the range of from about 1 percent by weight to about percent by weight, basis the total weight of the composition.

11. The composition of claim 9 wherein said alcohol ethoxysulfate has a chemical formula:

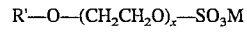

wherein R' is a straight chain or branched alkyl group having in the range of from about 8 to about 18 carbon atoms, or an alkylaryl group having an alkyl moiety having from about 8 to about 12 carbon atoms, x represents the average number of oxyethylene groups per molecule and is in the range of from about 1 to about 12, and M is a cation selected from an alkali metal, an ammonium ion, and mixtures thereof.

12. The composition of claim 1 wherein the composition additionally contains from about 2 percent by weight to about 5 percent by weight of a solubilizer selected from the group consisting of $C_2$–$C_3$ monohydric alcohols, $C_2$–$C_3$ polyhydric alcohols, water-soluble $C_1$–$C_3$ alkyl substituted benzene sulfonates, urea and mixtures thereof.

13. The composition of claim 1 wherein the composition additionally contains from about 0.1 percent by weight to about 8 percent by weight of a water-soluble zwitterionic surfactant.

14. The composition of claim 13 wherein the water-soluble zwitterionic surfactant is selected from the group consisting of decyl dimethyl betaine or 2-(N-decyl-N, N-dimethylammonio) acetate, coco dimethyl betaine or 2-(N-coco-N, N-dimethylammonio) acetate, myristyl dimethyl betaine, palmityl dimethyl betaine, lauryl dimethyl betaine, cetyl dimethyl betaine, stearyl dimethyl betaine, and mixtures thereof.

15. A liquid detergent composition comprising from about 1 percent by weight to about 35 percent by weight, basis the total weight of the composition, of one or more secondary alkyl sulfate compounds, from about 1 percent by weight to about 30 percent by weight, basis the total weight of the composition, of one or more alcohol ethoxysulfate compounds, from about 0.1 percent by weight to about 20 percent by weight, basis the total weight of the composition, of one or more suds stabilizers, from about 0.1 percent by weight to about 8 percent by weight, basis the total weight of the composition, of a water-soluble zwitterionic surfactant, from about 2 percent by weight, basis the total weight of the composition, to about 5 percent by weight of a solubilizer and from about 50 percent by weight to about 97 percent by weight, basis the total weight of the composition, of water.

* * * * *